United States Patent
Zhu et al.

(10) Patent No.: US 8,893,274 B2
(45) Date of Patent: Nov. 18, 2014

(54) CROSS-VM NETWORK FILTERING

(75) Inventors: Minghang Zhu, Changzhou (CN); Gongwei Qian, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 422 days.

(21) Appl. No.: 13/197,701

(22) Filed: Aug. 3, 2011

(65) Prior Publication Data

US 2013/0036470 A1    Feb. 7, 2013

(51) Int. Cl.
- *G06F 12/14* (2006.01)
- *G06F 21/00* (2013.01)
- *G06F 21/53* (2013.01)
- *H04L 29/06* (2006.01)

(52) U.S. Cl.
CPC .............. *G06F 21/53* (2013.01); *H04L 63/145* (2013.01); *H04L 63/0227* (2013.01)
USPC ...... 726/23; 726/13; 726/22; 718/1; 718/100; 718/101; 718/102

(58) Field of Classification Search
CPC ... H04L 63/00; H04L 63/0227; H04L 63/145; G06F 21/53; G06F 21/00
See application file for complete search history.

(56) References Cited

U.S. PATENT DOCUMENTS

| | | | |
|---|---|---|---|
| 7,784,053 B2* | 8/2010 | Casey et al. | 718/104 |
| 8,166,474 B1* | 4/2012 | Delco et al. | 718/1 |
| 8,190,778 B2* | 5/2012 | Shanbhogue | 709/250 |
| 8,533,390 B2* | 9/2013 | Dong et al. | 711/110 |
| 8,621,460 B2* | 12/2013 | Evans et al. | 718/1 |
| 8,762,991 B2* | 6/2014 | Johnson et al. | 718/1 |
| 8,782,658 B2* | 7/2014 | Ambat et al. | 718/104 |
| 2004/0093513 A1* | 5/2004 | Cantrell et al. | 713/201 |
| 2005/0086656 A1* | 4/2005 | Whitlock et al. | 718/1 |
| 2008/0148386 A1* | 6/2008 | Kreuk | 726/15 |
| 2008/0163207 A1* | 7/2008 | Reumann et al. | 718/1 |
| 2009/0150996 A1* | 6/2009 | Haswell | 726/22 |
| 2009/0254990 A1* | 10/2009 | McGee | 726/22 |

(Continued)

OTHER PUBLICATIONS

Tatte, "Shared Memory Based Communication Between Collocated Virtual Machines," MTP State 1 Report, Department of Computer Science and Engineering, Indian Institute of Technology, Bombay, Mumbai, 2010, pp. 1-21.*

(Continued)

*Primary Examiner* — Jung Kim
*Assistant Examiner* — James J Wilcox
(74) *Attorney, Agent, or Firm* — Beyer Law Group LLP

(57) ABSTRACT

A security virtual machine inspects all data traffic between other virtual machines on a virtualization platform in order to prevent an inter-VM attack. Data traffic between the machines is intercepted at the privileged domain and directed to the security virtual machine via a hook mechanism and a shared memory location. The traffic is read by the security machine and analyzed for malicious software. After analysis, the security machine sends back a verdict for each data packet to the privileged machine which then drops each data packet or passes each data packet on to its intended destination. The privileged domain keeps a copy of each packet or relies upon the security machine to send back each packet. The security machine also substitutes legitimate or warning data packets into a malicious data package instead of blocking data packets. The shared memory location is a circular buffer for greater performance. Traffic is intercepted on a single host computer or between host computers.

26 Claims, 7 Drawing Sheets

Virtualization Environment

(56) References Cited

U.S. PATENT DOCUMENTS

| | | | |
|---|---|---|---|
| 2009/0328193 A1* | 12/2009 | Moore et al. | 726/15 |
| 2012/0084517 A1* | 4/2012 | Post et al. | 711/153 |
| 2012/0096205 A1* | 4/2012 | Velayudhan et al. | 710/260 |
| 2012/0311570 A1* | 12/2012 | Gandhi et al. | 718/1 |
| 2012/0317569 A1* | 12/2012 | Payne et al. | 718/1 |

OTHER PUBLICATIONS

Natarajan, "Linux Firewall Tutorial: IP Tables, Chains, Rules Fundamentals," Jan. 26, 2011, pp. 1-9, retrieved from https://web.archive.org/web/20110126071453/http://www.thegeekstuff.com/2011/01/iptables-fundamentals/.*

* cited by examiner

Virtualization Environment

CROSS-VM NETWORK FILTERING

FIELD OF THE INVENTION

The present invention relates generally to the detection of malicious software on a computer. More specifically, the present invention relates to detection of malicious software between virtual machines in a virtualization environment.

BACKGROUND OF THE INVENTION

While malicious software certainly targets traditional computers running a single operating system, it can also target a computer running multiple operating systems. In a virtualization environment, different operating systems may run on a single computer and these may be subject to unique types of malicious software.

FIG. 1 illustrates a prior art virtualization environment 10 that is subject to attacks by malicious software. Any suitable computer hardware 20 executes a virtualization platform 30 which is a layer of software running directly on the computer hardware and which replaces the traditional operating system. The platform 30 allows the computer hardware to execute multiple operating systems concurrently such as a Microsoft operating system 50, a Linux operating system 60, Solaris, NetBSD, FreeBSD, and others. The privileged domain 40 may execute under any of a variety of operating systems as well. Each operating system 40-60 then may execute independently of the others and therefore each is considered a virtual machine (VM).

Unfortunately, the nature of a virtualization environment allows for a new threat called an inter-VM attack, in which malicious software under one operating system attacks programs and data under another operating system executing on the same host computer. An attack can also take place between virtual machines—from one host computer to another host computer.

Inter-VM attacks can be especially problematic in a public virtual cloud environment. Traditional network security software not accustomed to a virtualization environment has difficulty detecting or containing malicious inter-VM traffic between the virtual machines. More and more, a great deal of data center network traffic occurs between virtual machines on a host computer server, but, administrators find it more and more difficult to monitor such virtual machine traffic or to implement inspection or filtering policies. Such traffic between virtual machines might be invisible to traditional network monitoring tools such as packet inspection or filtering because such traffic does not use the physical network.

While one approach might be to scale back any virtualization efforts, this defeats the promise that virtualization offers terms of economic benefits. Physical security products cannot detect attacks that go from one virtual machine to another on the same host computer. And, attempting to send all inter-VM traffic out to the network in order to detect these inter-VM attacks is undesirable because it increases network latency. Accordingly, new techniques are desired to address inter-VM attacks and other malicious software within a virtualization environment.

SUMMARY OF THE INVENTION

To achieve the foregoing, and in accordance with the purpose of the present invention, a data traffic filtering technique is disclosed that detects and eliminates malicious software sent between virtual machines within a virtualization environment.

In one embodiment, an authorized security virtual machine is used to inspect all network traffic between the other virtual machines in order to prevent an inter-VM attack. Network traffic between the machines is directed to the security virtual machine via a hook mechanism operating under the privileged domain. To increase the performance of filtering all network traffic, a network filtering queue implements a circular buffer before sending the traffic to the security virtual machine.

In a second embodiment, a privileged virtual machine receives data packets for a first virtual machine that are destined for a second virtual machine. The data packets are intercepted using a hook routine implemented by the operating system of the privileged virtual machine. The data packets are sent to a shared memory location where they are read by a security virtual machine for analysis. After analysis, the security virtual machine sends back a verdict for each data packet to the privileged virtual machine which then drops each data packet or passes each data packet on to its intended destination.

In a third embodiment a security virtual machine reads data packets from a shared memory location where they have been written by a privileged domain of the virtualization environment. The packets had been destined for another virtual machine on the virtualization platform but they are first routed to the security machine for analysis. The packets are assembled into data packets and analyzed for malicious software. If malicious software is present, those packets representing the malicious software are blocked from being sent, either by being dropped by the security machine or by sending a block verdict to the privileged machine which then drops the offending data packet. If the data packet is legitimate, a pass verdict is provided for each data packet within the package.

In a fourth embodiment a security domain reads a data package from a memory location shared with a privileged domain of a virtualization platform. The data package is analyzed for malicious software, and if malicious software is detected then certain of the offending data packets are replaced with either legitimate data packets or warning data packets. Once replaced, the modified data package is then returned to the privileged domain for delivery to the destination virtual machine. The data package had been originally intended for the destination virtual machine but is intercepted by the privileged domain and sent to the memory location.

An attack can also take place between virtual machines from one host computer to another host computer. Such an attack can also be detected because the inter-machine traffic can be hooked and then scanned using any of these embodiments.

Further, the invention is not limited to detection of malicious software, but also can perform other traffic management tasks such as detection of malicious attacks that leverage the vulnerability of an operating system, an application, a firewall, etc.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
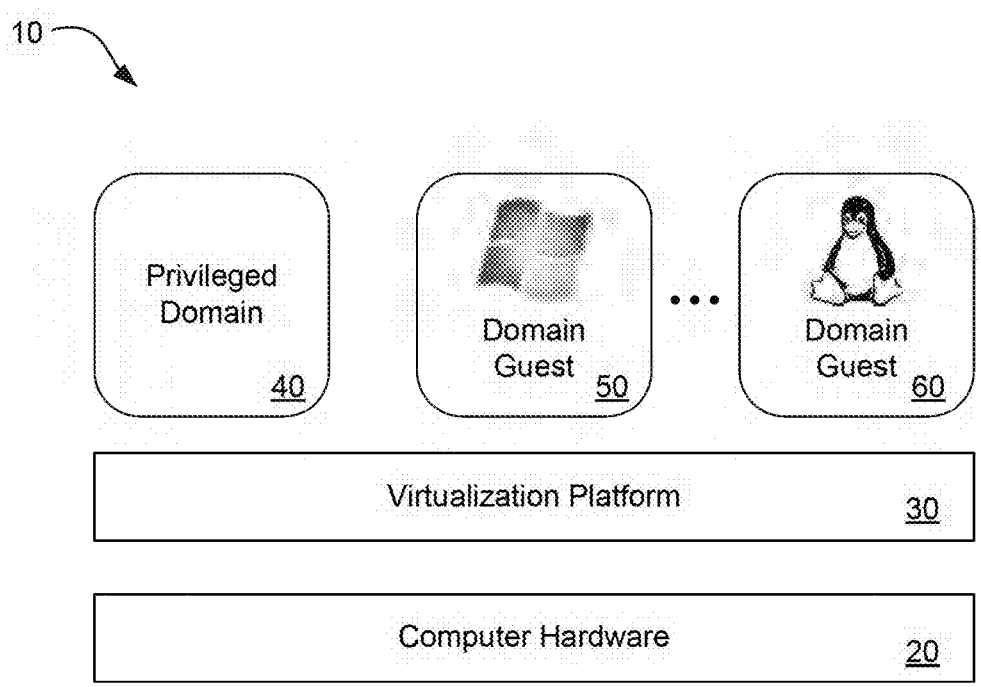
FIG. 1 illustrates a prior art virtualization environment that is subject to attacks by malicious software.

Referring again to FIG. 1, a virtualization platform 30, also known as a hypervisor, executes upon a computer processor such as an x86, x86-64, Itanium, Power PC, ARM, or other. In one particular embodiment, the virtualization platform 30 is the Xen hypervisor available from Citrix Systems, Inc. Other suitable virtualization platforms that may benefit from the present invention are the ESXI and vSphere hypervisors available from VMware, the HyperV Server hypervisor available from Microsoft Corporation, and the KVM hypervisor available from Linux. While the below discussion uses the Xen hypervisor as an example, one of skill in the art will understand that the present invention is suitable for use with a variety of virtualization platforms.

The virtualization platform 30 runs directly on the hardware 20 and becomes the interface for all hardware requests such as CPU, I/O, and disk for the various operating systems executing upon it. By separating the guest operating systems from the computer hardware, the hypervisor is able to run multiple operating systems securely and independently. The privileged domain 40 (or, Domain 0) is a privileged guest operating system executing within the hypervisor which has direct hardware access and other guest management responsibilities. Typically, the privileged domain can run most any operating system and has unique privileges allowing it to manage all aspects of the other domain guests such as starting, stopping, and I/O requests. The domain guests (e.g., operating systems 50 and 60) are unprivileged domains that are launched and controlled by the privileged domain and operate independently within the hypervisor. These domain guests are typically referred to as hardware virtual machines and are generally unaware that each is not running directly on the computer hardware.

Overview

Figure 2:
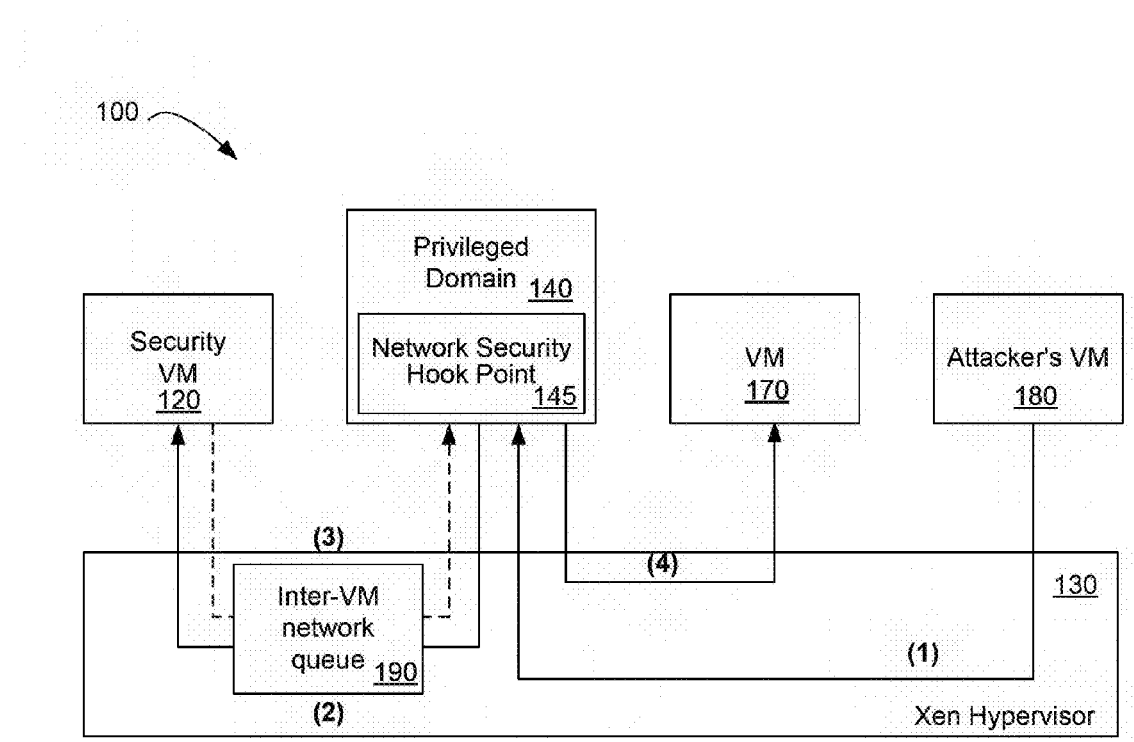
FIG. 2 illustrates use of a security virtual machine to implement the present invention.

FIG. 2 illustrates use of a security virtual machine to implement the present invention. Shown is a virtualization platform hypervisor 130 executing upon a suitable hardware platform (not shown) and any number of virtual machines 120, 140, 170 and 180 each executing its own operating system within the hypervisor. In this example, virtual machine 170 is a normal domain guest, virtual machine 180 is either under control of a malicious entity or is executing malicious software, virtual machine 140 is executing the privileged domain, and virtual machine 120 is executing a novel security domain. Within virtual machine 140 is a hook point 145 able to hook certain communications between virtual machines, and within the computer is an inter-VM queue 190 explained in more detail below.

As mentioned above, in a virtualization environment (especially in a virtual cloud environment) malicious attacks between virtual machines is a threat. In order to combat this threat, a special security virtual machine 120 is implemented on the host computer in which hypervisor 130 is executing. The hook point 145 intercepts all inter-VM traffic packages sent on the host computer (or between virtual machines on different host computers), and sends them to the security virtual machine via the inter-VM queue 190 for scanning and analysis.

An overview of the data flow is as follows. In step (1) the attacker virtual machine sends a data package to virtual machine 170. Because virtual machines within a virtualization environment theoretically may not communicate directly with one another (each is conceptually executing on a different computer), they need to communicate using a virtual network which is supplied by hypervisor 130 and the privileged domain 140. The privileged domain is also responsible for managing communications between virtual machines. Accordingly, any data packages sent between virtual machines will pass through the privileged domain before being sent to their destination. Examples of malicious software that may be sent from the attacker machine include: 1) malicious software such as viruses and Trojans, acquired via services like the Web, FTP, etc.; and 2) malicious packets sent from an attacker to a victim using tools that leverage the vulnerability of an operating system, a firewall or an application.

In step (2) the hook point 145 intercepts the data package (each of its packets, one-by-one) and puts it into the inter-VM queue 190. In step (3) the security virtual machine inspects the data packets and sends a verdict for each packet back to the privileged domain indicating pass or block. Alternatively, if the security virtual machine wishes to change the content of the data package, a modified data package is sent back to the privileged domain instead of a verdict for each packet. In step (4), according to the verdict packet or modified data package, the privileged domain blocks the network traffic or passes the network traffic on to the intended virtual machine 170.

Flow Diagram

Figure 3A:
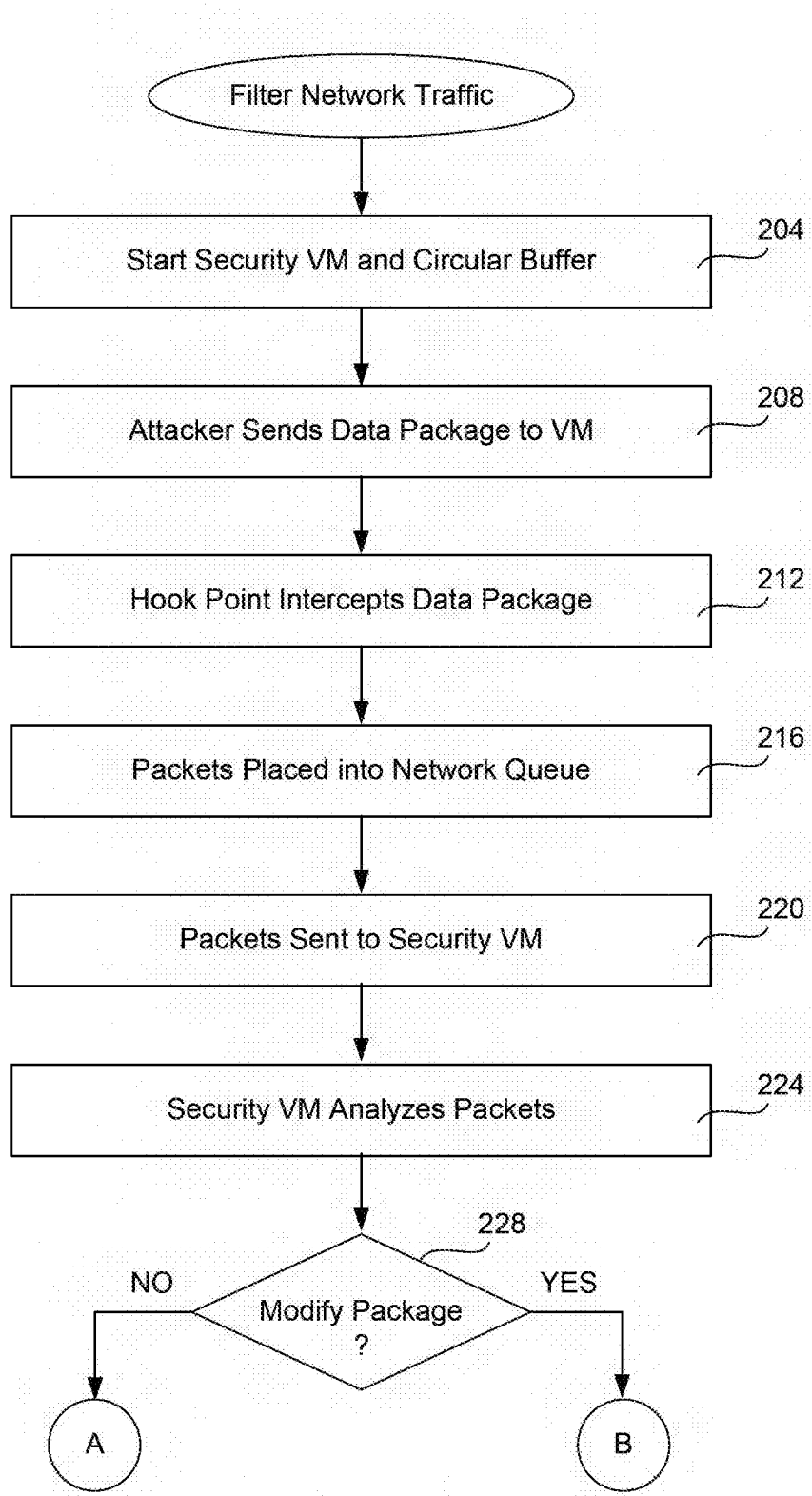
FIGS. 3A and 3B are a flow diagram describing one embodiment of the present invention.
Figure 3B:
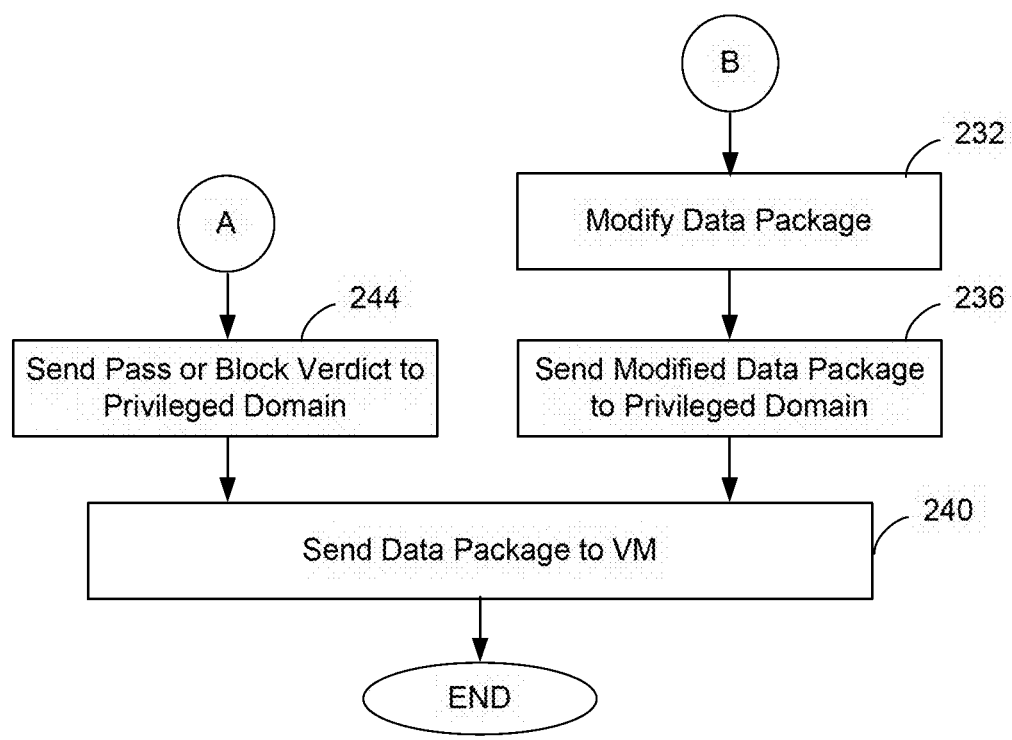

FIGS. 3A and 3B are a flow diagram describing one embodiment of the present invention. This embodiment is used to filter all data traffic between virtual machines within a virtualization environment. The traffic may be present in a virtual network on a single host computer and be passing between virtual machines on the host computer, or the traffic may be traveling on a physical network between host computers yet still passing between virtual machines on a different host computers. In a specific embodiment, all traffic sent from one virtual machine destined for another virtual machine is filtered according to the below steps.

In step 204 the security virtual machine begins execution and a security software application on this machine begins execution as well. A buffer such as circular buffer 300 is initialized. For example, the security application allocates dynamic memory within the host computer for use by the circular buffer and initializes a read pointer and a write pointer of that buffer.

Figure 4:
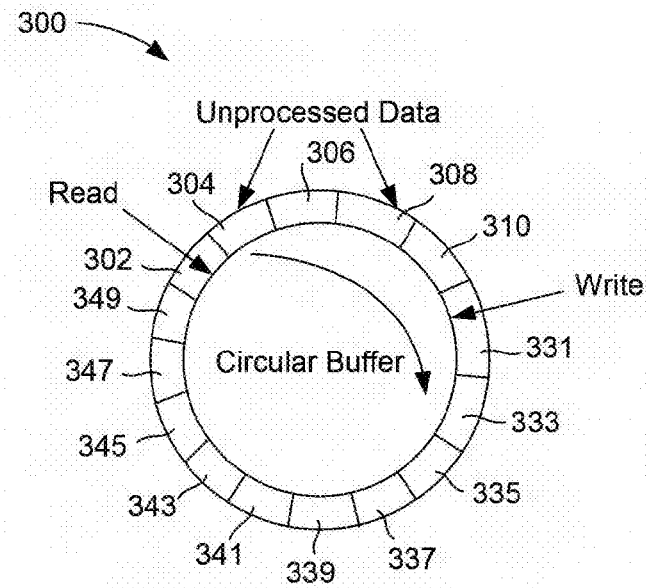
FIG. 4 illustrates a circular buffer for use by the invention.

FIG. 4 illustrates a circular buffer 300 for use by the invention. Buffer 300 includes a write pointer and a read pointer arranged to access each portion of the buffer. As known in the art, data in portions 302-310 has previously been written to the circular buffer and is ready to be read. Currently the read pointer points at location 302 as that is the next location in the buffer to be read (i.e., the data is still unprocessed). Portions 331-349 at this point are empty as data has not been written to these portions yet. Accordingly, the write pointer points to location 331 as that is the next location in which data will be written. Of course, circular buffers may be implemented in different ways as known to those of skill in the art. One advantage is that data may be written to the circular buffer by the privileged domain at the same time as the security machine is reading data from the circular buffer. FIG. 4 illustrates one example of a circular buffer that may be used in step 204 in order to implement inter-VM network queue 190. Of course, other data structures may be used to implement queue 190 as will be appreciated by those of skill in the art. The queue may be implemented in memory or in a storage device of the computer hardware, and is preferably implemented in shared memory controlled by hypervisor 130.

In addition to initializing the circular buffer, the security application grants access to the privileged domain to write data to this buffer. In this fashion, memory space allocated for use by the security virtual machine is able to be shared with the privileged domain. If not for the shared memory, the privileged domain and the security machine would not be able to write and read from the same memory location because they are conceptually different machines operating in different spaces. When the security virtual machine begins execution a memory segment is shared with the privileged domain through use of a grant table in one embodiment. In this fashion, the buffer in memory serves as a channel by which data packets may be sent from the privileged domain to the security machine; normally, data packets may not be sent directly from the privileged domain to the security machine.

As shown, the circular buffer includes data at locations 302-310 that has been written to the circular buffer but is currently unprocessed because it has not been read out of the buffer yet. The read pointer is set to location 302 as that is the next location to be read. The circular buffer includes empty locations 331-349 and the write pointer is set to location 331 because that is the next vacant location in which data may be written. In this example, the circular buffer is implemented as a first-in first-out buffer, meaning that the oldest data written to the buffer (e.g., data 302) will be the first data to be read out. Preferably, metadata such as the read pointer and the write pointer are saved in a separate page of the grant table. After the read operation or the write operation is completed, notification of that event is sent to the peer side by an event channel (an event notification mechanism provided by the Xen hypervisor 130). The notification is a synchronization mechanism between the privileged domain and the security virtual machine when a read/write is performed with the circular buffer. For example, the privileged domain writes to the circular buffer until the buffer is full, it will then wait for the peer (the security virtual machine) to give a notification indicating that the buffer is available for writing again. The notification is sent from the security virtual machine when it has read data from the buffer. The same situation happens when the security virtual machine reads all of the data in the buffer and waits for the notification from the privileged domain regarding when new data is available.

In step 208 an attacker virtual machine (for example) sends a data package to another virtual machine on the same host computer or to another virtual machine on a different host computer over a physical network. As known in the art, this data package includes a number of data packets. The data package may be malicious and include software to attack another virtual machine such as that mentioned above. For example, the destination virtual machine may be a Web server computer that has a known vulnerability. The attacking machine would then send a malicious data package able to attack the vulnerability of the Web server computer. It is possible for the invention to screen data packages sent from any virtual machine to another virtual machine, and not only from known malicious machines. Alternatively, the invention may filter data traffic from certain virtual machines or from a single virtual machine.

In step 212 the hook point 145 of the privileged domain intercepts any data packages sent by a virtual machine operating within hypervisor 130 or from another computer. Preferably, any data package sent within the virtual environment is intercepted and the packets of each data package are sent to the security virtual machine before being sent to their destination (if ever). Implementation of the hook point is described immediately below.

Figure 5:
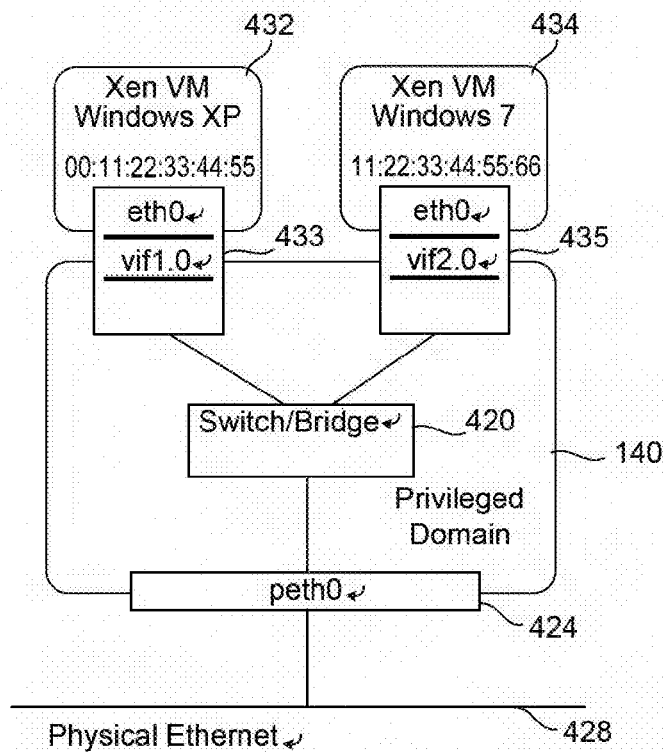
FIG. 5 illustrates conceptually the communications interface between the privileged domain and other virtual machines.

FIG. 5 illustrates conceptually the communications interface between the privileged domain and other virtual machines. Shown is the privileged domain 140 and two virtual machines 432 and 434 running different operating systems. In this specific example, also shown is a physical Ethernet 428 that connects the host computer of the privileged domain to another host computer; an interface 424 connects the domain to the Ethernet. In the specific embodiment in which the Xen hypervisor is used, a connected virtual Ethernet interface 433 and 435 is used for communications between the privileged domain and each of the other virtual machines on the same host computer.

In this embodiment, the privileged domain uses a bridge 420 in order to allow all domains (privileged and guest) to appear on a virtual network as if each were an individual host. As is known in the art, a bridge typically filters data traffic at the network boundary, operates at the data link layer (layer 2) of the OSI model, and inspects incoming network traffic and decides whether to forward or to discard it. A bridge serves a similar function as a switch, although a traditional bridge supports one network boundary, whereas a switch may offer four or more hardware ports. Accordingly, a switch may be used in place of bridge 420, and in particular, the Open vSwitch available under an open-source license may be used. In the context of a hypervisor, the vSwitch operates as a soft switch. Another bridge that may be used is the Linux native bridge available on the XEN platform.

In this embodiment, any data packets passing through the bridge 420 of the privileged domain will necessarily pass through the Pre-routing, Forward and Post-routing tables of chains of rules. Therefore, all packets passing through the privileged domain (whether exclusively on the host computer or between host computers) will pass through these chains of rules.

Figure 6:
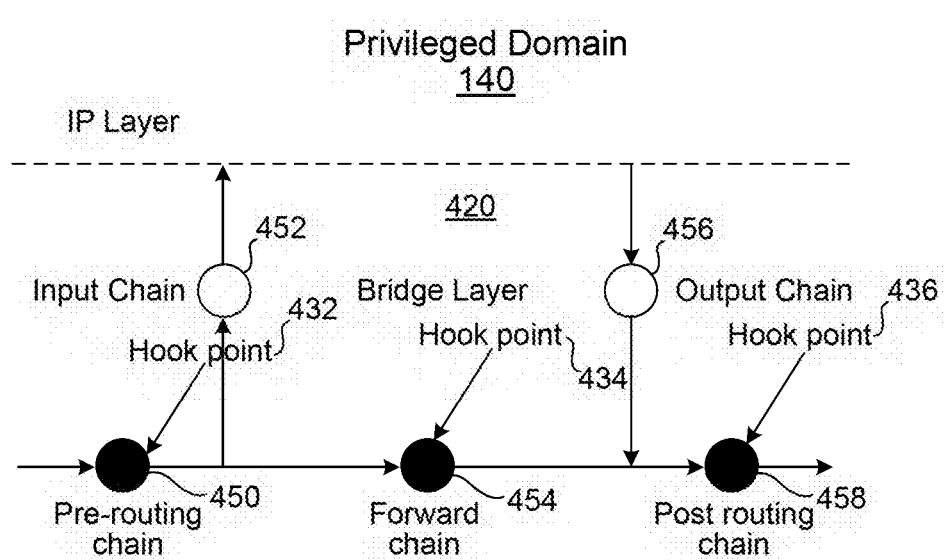
FIG. 6 illustrates hook points implemented in various of these chains.

FIG. 6 illustrates hook points implemented in various of these chains. Shown is the privileged domain 140, the bridge layer 420, and numerous hook points 432-436. Within the bridge 420 are tables that contain chains of rules for the treatment of data packets. Typically, there are five predefined chains of rules: the pre-routing chain 450, the input chain 452, the forward chain 454, the output chain 456, and the post-routing chain 458. Packets are processed by sequentially traversing the rules in the chains, and every network packet arriving or leaving from the privileged domain traverses at least one chain. Packets enter the pre-routing chain 450 before a routing decision is made. A packet that is going to be locally delivered (i.e., delivered to the privileged domain) enters the input chain 452. All packets that have been routed and are not for local delivery traverse the forward chain 454. Packets that are sent from the privileged domain itself traverse the output chain 456. Packets for which a routing decision has been made enter the post-routing chain 458 before being handed off to hardware for delivery.

Advantageously, it is realized that a system administrator or another user having the appropriate privileges may define a new rule in any of the chains in order to deal with incoming packets in a custom fashion. In the present invention, special rules or "hook points" are defined in the pre-routing chain, the forward chain, and the post-routing chain, namely hook points 432-436. Basically, these hook points perform the function of intercepting all packets that have arrived at the privileged domain from another virtual machine and that are destined for a different virtual machine; once intercepted, these packets are then rerouted to the queue 190. In this specific embodiment, hook points are only added to the chains 450, 454 and 458, and not to the input chain 452 nor the output chain 456. The reason is that the packets of a data package being sent from one virtual machine to another will always pass through the pre-routing, forward and post-routing chains. Only packets that are destined for the privileged domain will pass through the input chain 452, and, only packets that are coming from the privileged domain will pass through the output chain 456. Therefore, in order to intercept malicious packets sent between virtual machines, it is only necessary to hook chains 450, 454 and 458. Chains in this regard refer to from where the Netfilter stack was invoked, such as packet reception (BR_PREROUTING), locally delivered (BR_INPUT), forwarded (BR_FORWARD), locally output (BR_OUTPUT) or packet send (BR_POSTROUTING).

The attached appendix lists example computer code showing how a hook point may be implemented within one of the chains of rules. In general, under a Linux operating system, a rule in a chain implemented in the kernel module is able to call a specific data package handler. Each data packet is hooked, intercepted, and sent to the queue 190 by the data package handler.

In this specific computer code example, packet hooking takes place within the privileged domain (domain-0) and is a kernel module within Linux. Briefly, the hooking function is first registered in the bridge hooking point as a kernel module in Linux. The circular buffer is allocated memory space by the security virtual machine and access is granted to the circular buffer to the privileged domain. Thus, the privileged domain may manipulate the circular buffer as normal memory. Next, the hooking function intercepts the packet, places it into the queue (en-queue) and wakes up the thread ksend. The ksend thread iterates over the packets in the queue and redirects each packet to the security virtual machine by copying each packet into the circular buffer one-by-one. The code does not include implementation details such as include statements, kernel thread creation, circular buffer initialization, etc. Of course, one of skill in the art, depending upon the implementation, may choose to use a variation of this computer code, or may choose to use computer code in a different computer language.

Next, in step 216 the data packet that has been intercepted is placed into the network queue 190. For example, the next data packet is placed in location 331 indicated by the write pointer. Preferably, data packets are written to the circular buffer as quickly as they are intercepted by the hook points. In step 220 the software application on the security machine reads the next available packet from the circular buffer when the application is ready. For example, assuming that location 349 has already been read from, the application reads the next packet from the location 302 indicated by the read pointer. As mentioned earlier, depending upon the nature of the software application, the application may gather these packets into groups, may form the complete data package originally sent by the attacker machine, or may treat each packet individually.

In step 224 a software application on the security virtual machine analyzes the data packets sent to it from the queue 190. Depending upon the policy that an enterprise wishes to enforce, the level of sophistication of the security machine, or the type of malicious software to be detected, the application may analyze packets one-by-one, in groups, or the entire data package sent from the attacker's machine. One of skill in the art will understand how to analyze a data packets or a group of packets to detect malicious software. For example, an anti-virus pattern file may be applied to a collection of packets in order to detect malicious software. Another example is an IPS (Intrusion Prevention System)/IDS (Intrusion Detection System) that detects attacks based on packets; an anti-virus application scans the contents after assembling the packets.

In step 228 the software application determines whether or not to modify any packets or the data package received. For example, should the data package from the attacking virtual machine include a malicious URL, the software application may be designed to replace that malicious URL with a specific blocking page. When the user clicks upon the substituted URL (instead of the original malicious URL) the user receives a warning indicating that the original URL is malicious. Accordingly, if the decision is made to modify the data package, then step 232 of the software application of the security machine modifies packets within the data package to eliminate any risk of malicious software reaching the destination virtual machine. In this situation, most of the original data packets within the data package will eventually reach the destination machine, albeit with the malicious portions being substituted for.

In step 236 the modified data package is returned to the privileged domain for routing on to the original destination virtual machine. Preferably, each data packet is processed and sent to the privileged domain from the security machine with the exception of those data packets that have been replaced. Alternatively, instead of sending the entire, modified data package to the privileged domain, the security domain simply sends back the substitute data packets, relying upon the privileged domain to hold a copy of the original data package. The security domain then sends a block verdict for each of the data packets that have been substituted, and a pass verdict for the other packets. In this way, the privileged domain replaces the malicious data packets in its original copy with the substitute data packets received from the security domain.

By contrast, if in step 228 the decision is made not to modify any of the data packets or the entire data package (either because all of the packets are benign or because the elimination of the malicious software cannot be achieved through modification), then in step 244 the software application decides whether to pass or block individual data packets. If a data packet passes, then the packet is returned to the privileged domain along with a verdict of "pass." If a packet is to be blocked, then a "block" verdict is returned to the privileged domain for that particular data packet. Preferably, each packet is indicated as being passed or blocked: if an entire data package is passed, then each packet within that package will be flagged as "pass:" if an entire data package is blocked, then each packet within that package will be flagged as "block."

There are two approaches to passing or blocking data packets. In the first approach, the privileged domain holds all data packets and the security machine simply sends the verdict for each packet. In the second approach, the security machine will also send the data packet back to the privileged domain along with the verdict because the privileged domain is not storing each packet. Accordingly, if a packet receives a "pass," under the first approach the security machine simply sends the verdict along with the packet identifier to the privileged domain, under the second approach the security machine sends the actual packet along with the verdict. If a packet is to be blocked, under the first approach the security machine sends the "block" verdict along with the packet identifier to the privileged domain which will then drop the packet, under the second approach the security machine simply drops the blocked packet and may also send the packet identifier to the privileged domain. Of course, if a packet or data package is to be modified, then the entire modified data package is sent from the security machine back to the privileged domain for eventual routing, unless the alternative embodiment discussed above is used in which only portion of the modified data package is sent.

Finally, in step 240 the data packets and or data package that have been passed or modified are sent from the privileged domain to their original destination virtual machine. Any data packets or packages that have been blocked will not be sent.

Computer System Embodiment

Figure 7:
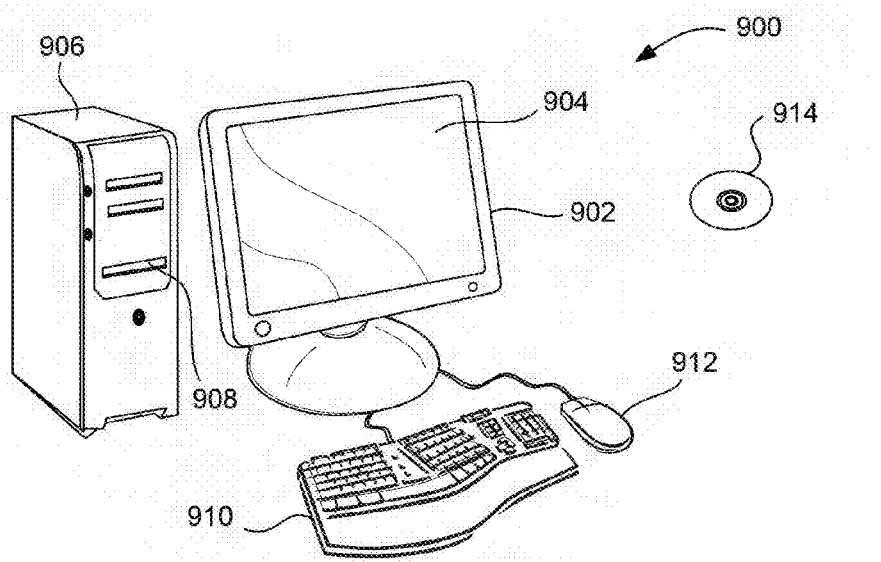
FIGS. 7 and 8 illustrate a computer system suitable for implementing embodiments of the present invention.
Figure 8:
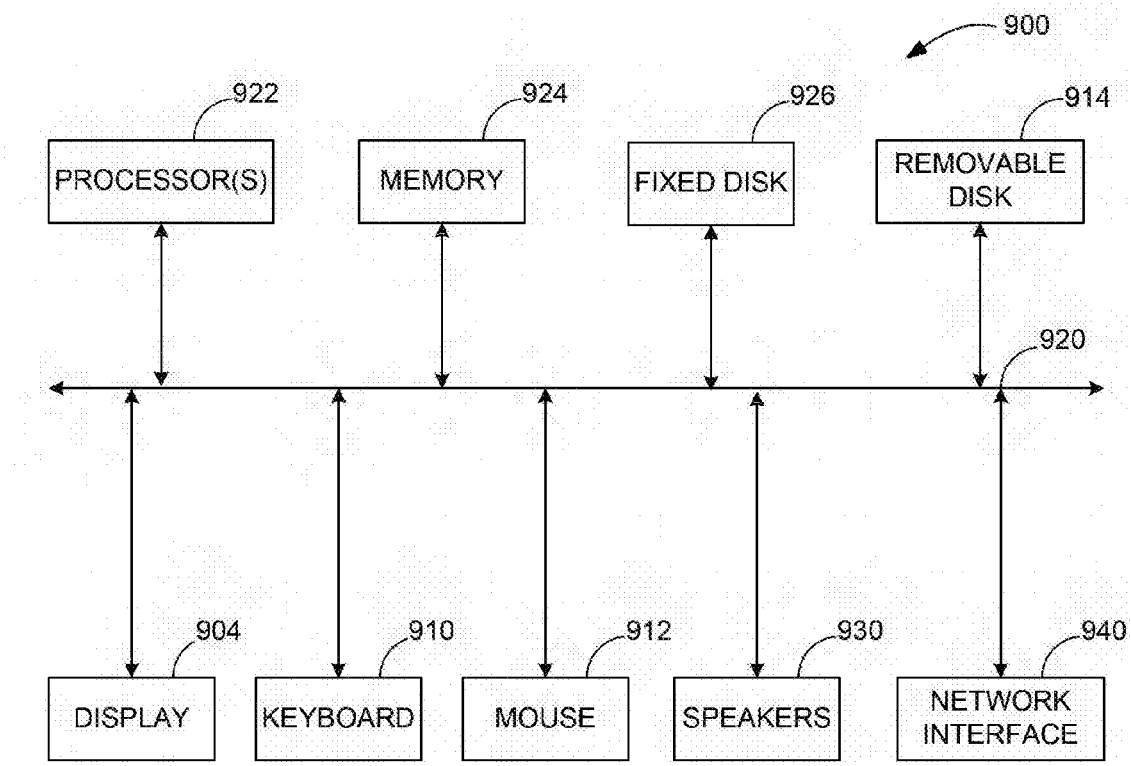

FIGS. 7 and 8 illustrate a computer system 900 suitable for implementing embodiments of the present invention. FIG. 7 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

APPENDIX

```
/* Common kthread queue */
struct compat_queue {
    struct list_head list;                /* entry list */
    unsigned long long queue_total;       /* entry total number */
    unsigned long long queue_maxlen;      /* entry max number, flow control? */
    unsigned long long queue_dropped;     /* entry dropped */
    spinlock_t lock;                      /* write protect lock */
    atomic_t id_sequence;                 /* id sequence */
    wait_queue_head_t wqh;                /* dispatch kthread wait queue */
    struct task_struct *tsk;              /* point back to dispatch kthread */
};
/* packet queue */
struct compat_queue dom0_filter_queue;
/* the hooking function will queue the packet in dom0_filter_queue */
static unsigned int br_app_fn(unsigned int hooknum,
#ifdef KERNEL_2_6_23_PLUS
        struct sk_buff *pskb,
#else
        struct sk_buff **pskb,
#endif
        const struct net_device *in,
        const struct net_device *out,
        int (*okfn)(struct sk_buff *))
{
    int cur_cpu = smp_processor_id( );
```

APPENDIX-continued

```c
#ifdef KERNEL_2_6_23_PLUS
    struct sk_buff *skb = pskb;
#else
    struct sk_buff *skb = *pskb;
#endif
    nfqnl_enqueue_packet(skb, NULL, cur_cpu, NULL);
    return NF_STOLEN;
}
/* enqueue packet and wake up ksend thread to redirect the packet to circular buffer */
static int nfqnl_enqueue_packet(struct sk_buff *skb, struct nf_info *info,
                    unsigned int queuenum, void *data)
{
    struct packet_entry *pkt_entry = build_pkt_entry(skb);
    spin_lock_bh(&dom0_filter_queue.lock);
    if (dom0_filter_queue.queue_total > dom0_filter_queue.queue_maxlen) {
        dom0_filter_queue.queue_dropped ++;
        rc = -ENOSPC;
        if (net_ratelimit( ))
            printk(KERN_WARNING "kqueue: full at %llu entries, dropping packets(s). Dropped: %llu\n",
                    dom0_filter_queue.queue_total, dom0_filter_queue.queue_dropped);
        goto err_out_unlock;
    }
    __enqueue_send_entry(&dom0_filter_queue, pkt_entry);
    if (waitqueue_active(&dom0_filter_queue.wqh))
        wake_up(&dom0_filter_queue.wqh);
    spin_unlock_bh(&dom0_filter_queue.lock);
err_out_unlock:
    spin_unlock_bh(&dom0_filter_queue.lock);
    return 0;
}
/* The ksend thread iterates the packet in queue, and redirect to circular buffer one by one
through send_entry_to_svm function. The send_entry_to_svm will copy the packet data into
circular buffer. The curcular buffer is allocated by SVM and grant access to domain-0
(previlledged domain). */
static int ksend(void *bind_cpu)
{
    for (;;) {
        INIT_LIST_HEAD(&dolist);
        spin_lock_bh(&dom0_filter_queue.lock);
        while (list_empty(&dom0_filter_queue.list) && !kthread_should_stop( )) {
            DEFINE_WAIT(wait);
            spin_unlock_bh(&dom0_filter_queue.lock);
            prepare_to_wait(&dom0_filter_queue.wqh, &wait, TASK_INTERRUPTIBLE);
            if (list_empty(&dom0_filter_queue.list) && !kthread_should_stop( )) {
                schedule( );
            }
            finish_wait(&dom0_filter_queue.wqh, &wait);
            spin_lock_bh(&dom0_filter_queue.lock);
        }
        if (kthread_should_stop( )) {
            spin_unlock_bh(&dom0_filter_queue.lock);
            break;
        }
        list_replace_init(&dom0_filter_queue.list, &dolist);
        total = dom0_filter_queue.queue_total;
        dom0_filter_queue.queue_total = 0;
        spin_unlock_bh(&dom0_filter_queue.lock);
        /* do real action */
        list_for_each_entry_safe(pkt_entry, tmp_entry, &dolist, list) {
            list_del(&pkt_entry->list);
            status = send_entry_to_svm(&send_channel, pkt_entry);
        }
    }
}
#define BR_HOOKING_PRIORITY    -301
static struct nf_hook_ops br_app_post_ops = {
    .hook    = br_app_fn,
    .owner   = THIS_MODULE,
    .pf      = PF_BRIDGE,
    .hooknum = NF_BR_POST_ROUTING,
    .priority = BR_HOOKING_PRIORITY
};
/* 1. register hook function in NF_BR_POST_ROUTING hooking point
 * 2. create ksend thread for packet redirection */
static int __init kqueue_init(void)
```

APPENDIX-continued

```
{
    int status = nf_register_hook(&br_app_post_ops);
    if(status < 0)
        goto init_out;
    status = create_service_thread( );
init_out:
    return status;
}
/* unregister hook function in NF_BR_POST_ROUTING hooking point */
static void __exit kqueue_fini(void)
{
    nf_unregister_hook(&br_app_post_ops);
}
module_init(kqueue_init);
module_exit(kqueue_fini);
```

We claim:

1. A method of filtering data traffic in a virtualization environment, said method comprising:
receiving, at a privileged virtual machine executing a privileged domain responsible for managing communication between virtual machines, a data packet from a first virtual machine destined for a second virtual machine, said privileged virtual machine executing upon a virtualization platform on a host computer, wherein data packets of said virtualization environment pass through said privileged virtual machine;
intercepting said data packet by said privileged virtual machine;
sending said data packet from said privileged virtual machine to a memory location in said host computer shared between said privileged virtual machine and a security virtual machine executing a security domain on said virtualization platform, said sending not utilizing a virtual network of said virtualization environment, said security virtual machine being a different virtual machine than said privileged virtual machine;
receiving at said privileged virtual machine a verdict from said security virtual machine regarding said data packet; and
passing said data packet to said second virtual machine or dropping said data packet based upon said verdict.

2. The method as recited in claim 1 further comprising:
intercepting said data packet by using a hooking routine in the operating system of said privileged virtual machine, whereby said data packet is sent to said memory location instead of being sent to said second virtual machine.

3. The method as recited in claim 1 wherein said first and second virtual machines are both executing upon said virtualization platform on said host computer.

4. The method as recited in claim 1 wherein said memory location has been allocated by said security virtual machine in a memory of said host computer.

5. The method as recited in claim 1 wherein said verdict indicates passing said data packet, said method further comprising:
receiving said data packet from said security virtual machine along with said verdict.

6. The method as recited in claim 1 wherein said verdict indicates passing said data packet, said method further comprising:
holding a copy of said data packet at said privileged virtual machine after said sending, wherein said verdict received from said security virtual machine does not include said data packet.

7. The method as recited in claim 1 wherein said verdict indicates blocking said data packet, said method further comprising:
dropping said data packet by said security virtual machine, wherein a copy of said data packet is not retained by said privileged virtual machine after said sending.

8. The method as recited in claim 1 further comprising:
reading said data packet from said shared memory location by said security virtual machine; and
analyzing said data packet by said security virtual machine.

9. The method as recited in claim 1 further comprising:
granting access by said security virtual machine to said privileged virtual machine to write data packets into said shared memory location.

10. The method as recited in claim 1 further comprising:
intercepting said data packet by defining a rule in a pre-routing chain, in a forward chain, or in a post-routing chain of a bridge or a switch in said privileged virtual machine.

11. A method of filtering data traffic in a virtualization environment, said method comprising:
reading, by a security virtual machine executing a security domain, a plurality of data packets from a memory location in a host computer shared between said security virtual machine and a privileged virtual machine executing a privileged domain responsible for managing communication between virtual machines, said security virtual machine executing upon a virtualization platform on said host computer, wherein data packets of said virtualization environment pass through said privileged virtual machine, and wherein said reading not utilizing a virtual network of said virtualization environment, said security virtual machine being a different virtual machine than said privileged virtual machine;
assembling said data packets into a data package;
analyzing said data package by said security virtual machine to determine if malicious software is present;
determining a pass or a block verdict for one of said data packets based upon said analyzing; and
sending said verdict to said privileged virtual machine along with an indication of said data packet.

12. The method as recited in claim 1 wherein said verdict is a block verdict for said data packet, and wherein said indication of said data packet is a packet identifier.

13. The method as recited in claim 11 wherein said verdict is a pass verdict for said data packet, said method further comprising:
sending said data packet along with said verdict to said privileged virtual machine.

14. The method as recited in claim 11 wherein said verdict is a pass verdict for said data packet, said method further comprising:
sending said pass verdict to said privileged virtual machine along with a packet identifier for said data packet without sending said data packet.

15. The method as recited in claim 11 further comprising:
modifying at least one of said data packets to eliminate said malicious software; and
sending said at least one of said data packets to said privileged virtual machine.

16. The method as recited in claim 11 wherein said memory location is a buffer allocated for use by said security virtual machine, said method further comprising:
granting access by said security virtual machine to said privileged virtual machine to write data packets into said memory location.

17. The method as recited in claim 11 further comprising:
intercepting said data packets between a first virtual machine and a second virtual machine by defining a rule in a pre-routing chain, in a forward chain, or in a post-routing chain of a bridge or a switch in said privileged virtual machine.

18. A method of modifying data traffic in a virtualization environment, said method comprising:
reading, by a security virtual machine executing a security domain, a plurality of data packets from a memory location in a host computer shared between said security virtual machine and a privileged virtual machine executing a privileged domain responsible for managing communication between virtual machines, said security virtual machine executing upon a virtualization platform on said host computer, wherein data packets of said virtualization environment pass through said privileged virtual machine, and wherein said reading not utilizing a virtual network of said virtualization environment, said security virtual machine being a different virtual machine than said privileged virtual machine;
assembling said data packets into a data package;
detecting malicious software in said data package;
replacing, by said security virtual machine, a subset of said data packets to eliminate said malicious software in said data package; and
returning said modified data package to said privileged virtual machine.

19. The method as recited in claim 18 wherein said data packets originate with a first virtual machine and are destined for a second virtual machine, said method further comprising:
delivering said modified data package to said second virtual machine.

20. The method as recited in claim 18 further comprising:
writing said data packets into said memory location by said privileged virtual machine; and
said privileged virtual machine not retaining a copy of said data packets after said writing.

21. The method as recited in claim 18 wherein said data packets originate with a first virtual machine and are destined for a second virtual machine, said method further comprising:
not delivering said data package to said second virtual machine before said step of returning.

22. The method as recited in claim 18 further comprising:
returning only said subset of said data packets to said privileged domain; and
returning a packet identifier for each data packet in said data package that is not in said subset to said privileged domain.

23. The method as recited in claim 18 further comprising:
detecting said malicious software in said data package by a software application executing upon said security virtual machine.

24. The method as recited in claim 18 wherein said data packets originate with a first virtual machine and are destined for a second virtual machine, and wherein said first virtual machine and said second virtual machine are located upon different host computers.

25. The method as recited in claim 18 further comprising:
granting access by said security virtual machine to said privileged virtual machine to write data packets into said shared memory location.

26. The method as recited in claim 18 further comprising:
intercepting said data packets between a first virtual machine and a second virtual machine by defining a rule in a pre-routing chain, in a forward chain, or in a post-routing chain of a bridge or a switch in said privileged virtual machine.

* * * * *

UNITED STATES PATENT AND TRADEMARK OFFICE
CERTIFICATE OF CORRECTION

PATENT NO. : 8,893,274 B2  
APPLICATION NO. : 13/197701  
DATED : November 18, 2014  
INVENTOR(S) : Zhu et al.

Page 1 of 1

It is certified that error appears in the above-identified patent and that said Letters Patent is hereby corrected as shown below:

In the Claims

In line 1 of claim 12 (column 14, line 60) change "Claim 1" to --Claim 11--.

Signed and Sealed this  
Fourteenth Day of July, 2015

Michelle K. Lee  
*Director of the United States Patent and Trademark Office*